(12) United States Patent
Yamaguchi et al.

(10) Patent No.: US 11,886,566 B2
(45) Date of Patent: Jan. 30, 2024

(54) VEHICLE AUTHENTICATION SYSTEM AND IN-VEHICLE DEVICE

(71) Applicant: DENSO CORPORATION, Kariya (JP)

(72) Inventors: Toru Yamaguchi, Kariya (JP); Kenji Kato, Kariya (JP); Takeshi Kumazaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 855 days.

(21) Appl. No.: 16/940,634

(22) Filed: Jul. 28, 2020

(65) Prior Publication Data
US 2020/0356652 A1 Nov. 12, 2020

Related U.S. Application Data

(63) Continuation of application No. PCT/JP2019/000429, filed on Jan. 10, 2019.

(30) Foreign Application Priority Data

Jan. 30, 2018 (JP) ................. 2018-013907

(51) Int. Cl.
G06F 21/45 (2013.01)
G06F 21/35 (2013.01)
H04W 4/80 (2018.01)
H04W 4/40 (2018.01)
G06Q 10/02 (2012.01)
H04W 12/06 (2021.01)

(52) U.S. Cl.
CPC ............. *G06F 21/35* (2013.01); *G06Q 10/02* (2013.01); *H04W 4/40* (2018.02); *H04W 4/80* (2018.02); *H04W 12/06* (2013.01)

(58) Field of Classification Search
None
See application file for complete search history.

(56) References Cited

U.S. PATENT DOCUMENTS

2003/0122651 A1  7/2003 Doi et al.
2015/0348179 A1* 12/2015 Kamisawa ............. G08G 1/205
                                                        705/5
2016/0027307 A1*  1/2016 Abhyanker ............ G08G 1/202
                                                        701/117
2017/0092027 A1  3/2017 Sasaki
(Continued)

FOREIGN PATENT DOCUMENTS

EP      2098419 A     9/2009
JP   2000342309 A    12/2000
(Continued)

Primary Examiner — Nelson S. Giddins
(74) Attorney, Agent, or Firm — Harness, Dickey & Pierce, P.L.C.

(57) ABSTRACT

A vehicle authentication system includes a ring-type wearable device, an in-vehicle device, and a communication terminal. The in-vehicle device performs authentication regarding use of the vehicle. The in-vehicle device causes a short-range communication module to perform short-range wireless communication with the ring-type wearable device that has unique identification information. The in-vehicle device acquires information received by a wide area communication module configured to communicate, via a network, with the communication terminal configured to make a reservation for the use of the vehicle.

10 Claims, 7 Drawing Sheets

(56) References Cited

U.S. PATENT DOCUMENTS

2019/0077368 A1* 3/2019 Hwang .................. H04W 4/60
2020/0272948 A1* 8/2020 Meyer ................... G06Q 50/14

FOREIGN PATENT DOCUMENTS

| JP | 2003093368 A | 4/2003 |
| JP | 2003120097 A | 4/2003 |
| JP | 2003-262060 A | 9/2003 |
| JP | 2004157873 A | 6/2004 |
| JP | 2009-208499 A | 9/2009 |
| JP | 2010122988 A | 6/2010 |
| JP | 2014058817 A | 4/2014 |
| JP | 2017065547 A | 4/2017 |

* cited by examiner

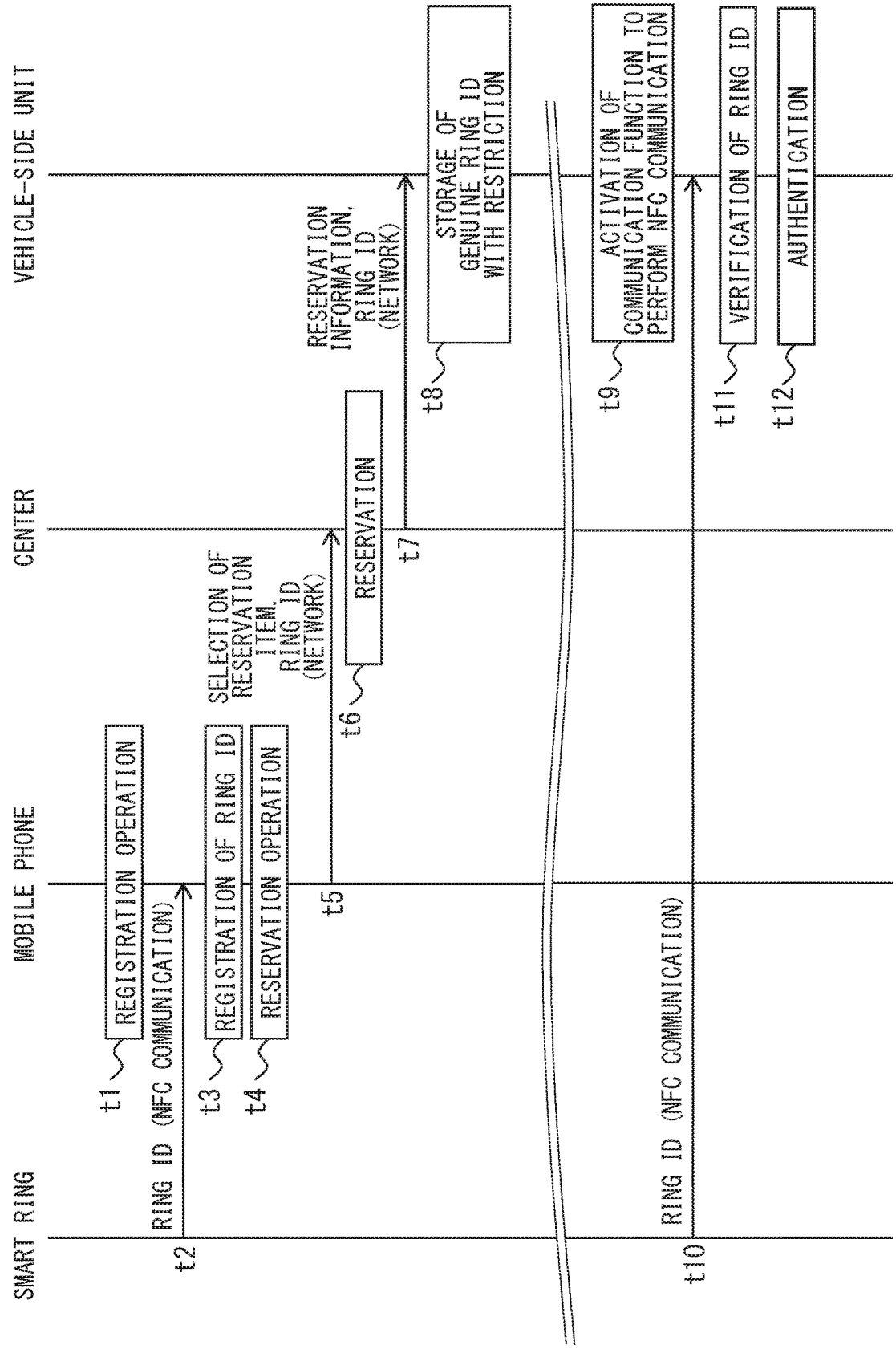

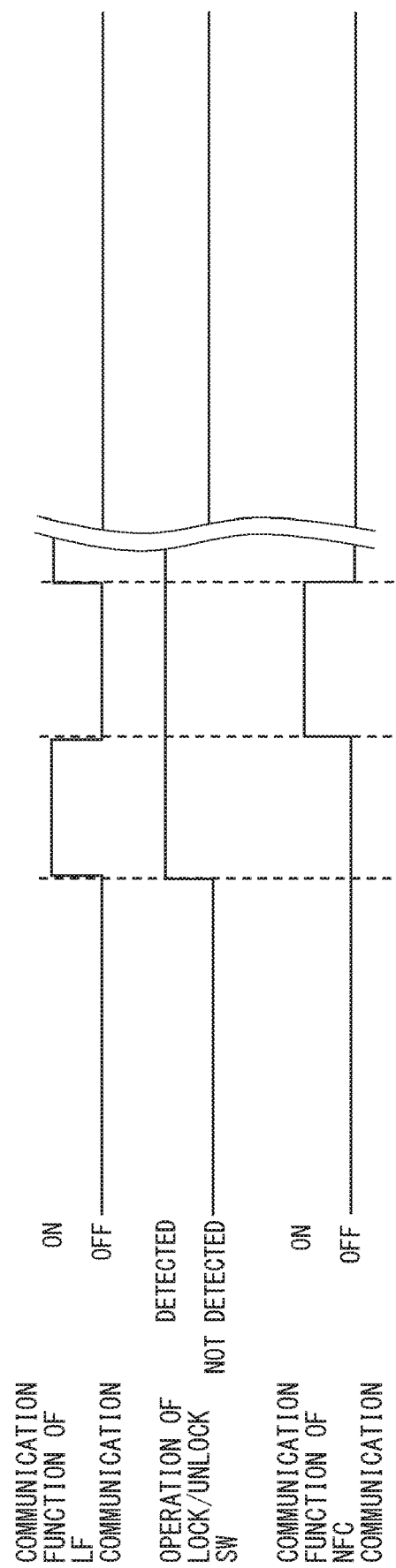

VEHICLE AUTHENTICATION SYSTEM AND IN-VEHICLE DEVICE

CROSS REFERENCE TO RELATED APPLICATIONS

The present application is a continuation application of International Patent Application No. PCT/JP2019/000429 filed on Jan. 10, 2019, which designated the U.S. and claims the benefit of priority from Japanese Patent Application No. 2018-013907 filed on Jan. 30, 2018. The entire disclosures of all of the above applications are incorporated herein by reference.

TECHNICAL FIELD

The present disclosure relates to a vehicle authentication system and an in-vehicle device for performing authentication regarding use of a vehicle by verification through wireless communication.

BACKGROUND

A technique in which authentication regarding use of a vehicle is performed by verification between the vehicle and an electronic key through wireless communication has been proposed. In recent years, a technique in which a mobile phone is used as the electronic key has been also proposed. For example, when an authorized driver approaches the vehicle and pushes a call button of a portable terminal (that is, a mobile phone), an in-vehicle device receives the call signal and a door lock is released in a case where an ID number of the portable terminal included in the call signal is correct.

SUMMARY

The present disclosure provides a vehicle authentication system. The vehicle authentication system includes a ring-type wearable device, an in-vehicle device, and a communication terminal. The in-vehicle device performs authentication regarding use of the vehicle. The in-vehicle device causes a short-range communication module to perform short-range wireless communication with the ring-type wearable device that stores unique identification information. The in-vehicle device acquires information received by a wide area communication module that communicates, via a network, with the communication terminal that makes a reservation for the use of the vehicle.

BRIEF DESCRIPTION OF DRAWINGS

The features and advantages of the present disclosure will become more apparent from the following detailed description made with reference to the accompanying drawings. In the drawings:

FIG. 8 is a sequence diagram illustrating an example of flow of authentication in the vehicle authentication system employing the smart ring; and FIG. 9 is a diagram illustrating an example of exclusive control which turns on exclusively one of a communication function to perform LF communication and a communication function to perform NFC communication.

DETAILED DESCRIPTION

Figure 1:
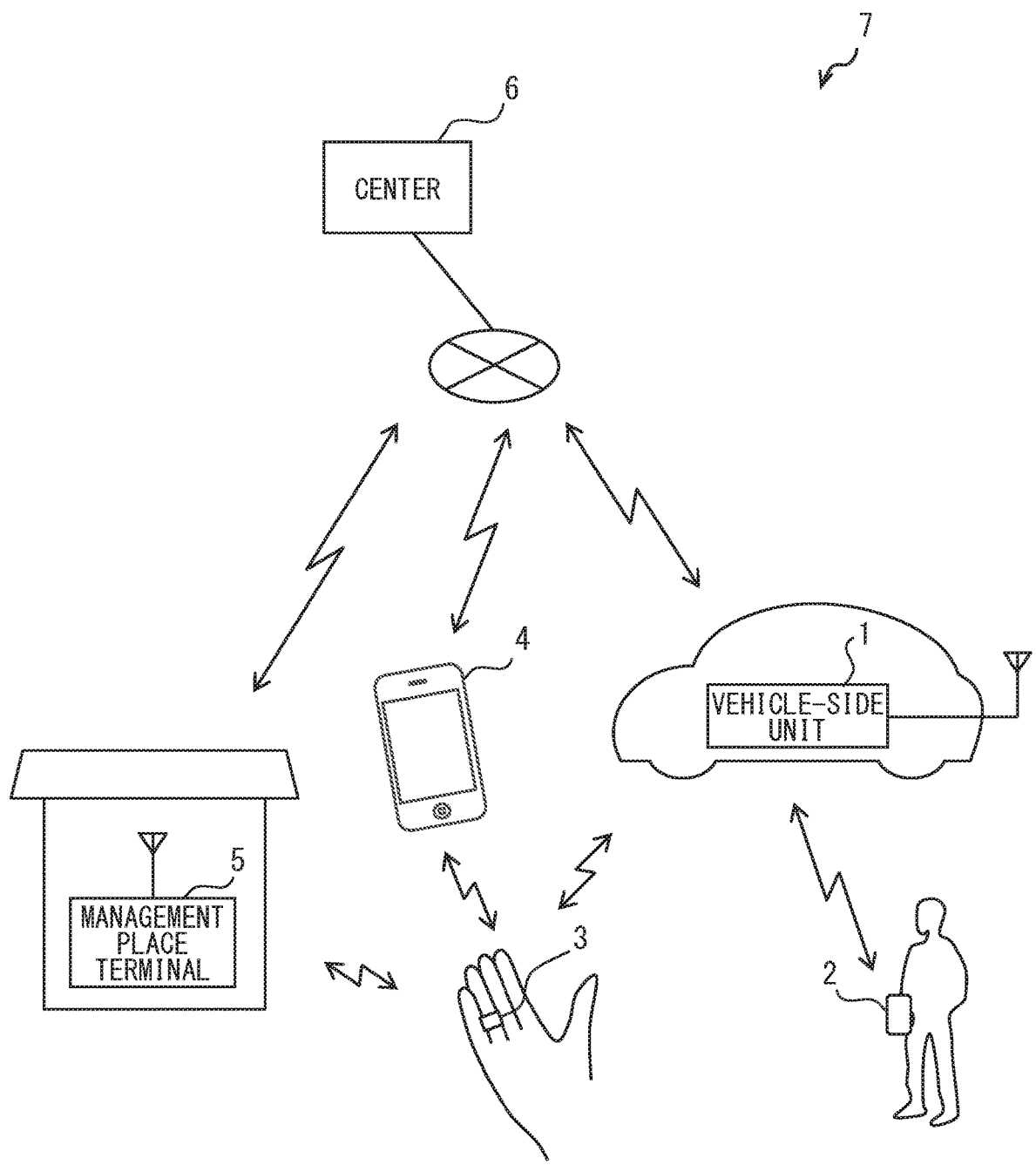
FIG. 1 is a diagram illustrating an example of a configuration of a vehicle authentication system.

For example, when a plurality of users share one electronic key of a rental car or a vehicle used for car sharing (hereinafter referred to as a share car), it requires time and effort for lending-out and returning the electronic key. Therefore, for improvement in convenience, it is preferred that each user has a device which has a function of the electronic key.

However, when a mobile phone is used as the electronic key, a user needs to perform an operation to push a call button, for example, in order to perform verification through wireless communication. When using a vehicle, the user has to take out a mobile phone, starts it, and performs the operation. Therefore, it is desirable to enhance security and to improve convenience in authentication for use of the vehicle.

It is also desirable to allow the user to use a plurality of vehicles without changing a device which has the function of the electronic key.

The present disclosure provides a vehicle authentication system and an in-vehicle device each of which enables a user to utilize a plurality of vehicles without changing a device that has a function of an electronic key, and which makes it possible to enhance security and to improve convenience in authentication for use of the vehicle.

An exemplary embodiment of the present disclosure provides a vehicle authentication system that includes a ring-type wearable device, an in-vehicle device, and a communication terminal. The ring-type wearable device has a ring shape to be worn on a finger of a user, has unique identification information, and includes a ring-side short-range communication unit configured to perform short-range wireless communication. The in-vehicle device is attached to a vehicle. The in-vehicle device includes an authentication unit, a vehicle-side short-range communication unit, and a reception information acquisition unit. The authentication unit performs authentication regarding use of the vehicle. The vehicle-side short-range communication unit causes a short-range communication module attached to the vehicle to perform the short-range wireless communication. The reception information acquisition unit acquires information received by a wide area communication module that is attached to the vehicle and communicates via a network. The communication terminal includes a reservation unit, a terminal-side short-range communication unit, and a terminal-side wide area communication unit. The reservation unit makes a reservation for the use of the vehicle. The terminal-side short-range communication unit performs the short-range wireless communication. The terminal-side wide area communication unit communicates via the network. When the ring-side short-range communication unit performs the short-range wireless communication with the terminal-side short-range communication unit, the ring-side short-range communication unit transmits the identification information to the terminal-side short-range communication unit by the short-range wireless communication. When the reservation unit makes the reservation, the terminal-side wide area communication unit transmits the identification information to the wide area communication module via the network. The short-range communication module is located at a position at which a part of the vehicle operated by a finger of the user is included in a communication range of the short-range wireless communication of the short-range communication module. When the ring-side short-range communication unit performs the short-range wireless communication with the short-range communication module, the ring-side short-range communication unit transmits the identification information to the short-range communication module by the short-range wireless communication. The authentication unit performs the authentication based on verification between the identification information received by the short-range communication module and the identification information acquired by the reception information acquisition unit.

An exemplary embodiment of the present disclosure provides an in-vehicle device attached to a vehicle. The in-vehicle device includes an authentication unit, a vehicle-side short-range communication unit, and a reception information acquisition unit. The authentication unit performs authentication regarding use of the vehicle. The vehicle-side short-range communication unit causes a short-range communication module to perform short-range wireless communication with a ring-type wearable device that has a ring shape to be worn on a finger of a user, and has unique identification information. The reception information acquisition unit acquires information received by a wide area communication module configured to communicate, via a network, with a communication terminal configured to make a reservation for the use of the vehicle. The short-range communication module is provided at a position to include a part of the vehicle operated by the finger of the user in a communication range of the short-range wireless communication of the short-range communication module. When the communication terminal makes the reservation, the reception information acquisition unit acquires, via the network, the identification information received by the wide area communication module from the ring-type wearable device through the communication terminal. When the short-range communication module performs the short-range wireless communication with the ring-type wearable device, the authentication unit performs the authentication based on verification between identification information received by the short-range communication module from the ring-type wearable device and the identification information acquired by the reception information acquisition unit.

In the exemplary embodiment of the present disclosure, when reservation for the use of the vehicle is made by the communication terminal, the unique identification information of the ring-type wearable device is transmitted to the wide area communication module of the vehicle via the communication terminal. Accordingly, via the wide area communication module, the in-vehicle device of the vehicle made the reservation of the use by the user can acquire the identification information unique to the ring-type wearable device worn on the user's finger. The authentication unit performs the authentication regarding the use of the vehicle based on the verification between the identification information acquired by the in-vehicle device and the identification information received by the short-range communication module of the vehicle from the ring-type wearable device. Therefore, when the reservation is made for use of different vehicles using the same ring-type wearable device, it is possible to use these different vehicles. Accordingly, it is possible for a user to use a plurality of vehicles without changing the device that has the function of an electronic key.

The communication range of the short-range communication module caused to perform the short-range wireless communication by the vehicle-side short-range communication unit includes a part operated with a user's finger when using the vehicle. Accordingly, when the user with the ring-type wearable device worn on the user's finger operates the part to be operated with the user's finger, it is possible for the short-range communication module to receive the identification information from the ring-side short-range communication unit of the ring-type wearable device. Therefore, it is possible to improve the convenience in the authentication at the time of using the vehicle.

Furthermore, the short-range communication module and the ring-side short-range communication unit of the ring-type wearable device employ the short-range wireless communication in conformity with the standard of NFC for the exchange of identification information. The short-range wireless communication in conformity with the standard of NFC has the very short communication range; therefore, interception of the communication by a third party is difficult. Accordingly, it is possible to enhance the security in the authentication at the time of using a vehicle. As a result, a user is enabled to utilize a plurality of vehicles without changing a device that has the function of an electronic key, and at the same time, it is possible to enhance the security and to improve the convenience in the authentication at the time of using the vehicle.

With reference to the drawings, a plurality of embodiments for the disclosure will be described. For convenience of description, the same reference numerals are designated to parts having the same functions as those of parts illustrated in the drawings described in a plurality of embodiments, and their description may not be repeated. Regarding the parts to which the same reference numerals are designated, the description in another embodiment can be referred to.

First Embodiment (Configuration of Vehicle Authentication System 7)

Hereinafter, a first embodiment of the present disclosure will be described with reference to the drawings. As illustrated in FIG. 1, a vehicle authentication system 7 includes a vehicle-side unit 1, a portable device 2, a smart ring 3, a mobile phone 4, a management place terminal 5, and a center 6.

The vehicle-side unit 1 is employed in a vehicle and is capable of performing wireless communication with the portable device 2 and the smart ring 3. Based on the verification performed through the wireless communication, the authentication regarding use of the vehicle is performed. The details of the vehicle-side unit 1 are described later.

It is assumed that a vehicle which employs the vehicle-side unit 1 is a vehicle which is utilized by a plurality of users not belonging to the same household, such as a rental car and a share car (hereinafter referred to as a service vehicle). The service vehicle may be a vehicle dispatched by automatic driving or a vehicle performing passenger transport by automatic driving. The share car includes a share car employed for the ride share in which unacquainted users ride together on the car, and a share car employed for the car share in which a privately-owned vehicle is lent out to the others in the time zone at which the manager of the vehicle does not use the car. In the following, a user who lends out a rental car and a user who provides a share car as service are called a manager, and a user who rents the rental car and a user who uses the share car as service are called a service user.

The portable device 2 is what is called a fob that has a function of an electronic key and is carried by a manager of the vehicle that employs the vehicle-side unit 1. The portable device 2 receives, via a reception antenna, a request signal transmitted from the vehicle-side unit 1 by means of a radio wave in an LF (Low Frequency) band. The LF band is a frequency band of low frequencies in 30 kHz to 300 kHz for example and the radio wave in the LF band corresponds to a long wave. In the present embodiment, it is assumed that a request signal is a signal for verification and requesting transmission of a code for verification. When a request signal is received, the portable device 2 returns a response signal including the code for verification on a radio wave of an RF (Radio Frequency) band via a transmission antenna. The RF band is a frequency band of high frequencies in 300 kHz to 3 THz, for example. When a challenge response system is employed, the request signal corresponds to a challenge signal, and the code for verification corresponds to an encryption code obtained after a code of the challenge signal is encrypted by a secret key employed in the common key encryption system and an encryption algorithm.

The smart ring 3 is a ring-type wearable device having the shape of a ring and worn on a service user's finger. The smart ring 3 transmits a signal by means of the short-range wireless communication (hereinafter referred to as NFC communication) in conformity with the standard of NFC (Near Field Communication) of the wireless communication. The NFC communication is restricted to about 10 cm in the communication range, and can be expressed as a near-field-type wireless communication in another way. The details of the smart ring 3 are described later.

It is assumed that the mobile phone 4 is a communication terminal carried by the service user, and a multifunctional mobile phone such as a smartphone. The mobile phone 4 has a function to perform communication via a network and function to perform the NFC communication. The details of the mobile phone 4 are described later.

The management place terminal 5 is a communication terminal provided in a facility to manage a service vehicle (hereinafter referred to as a management place). The management place terminal 5 has a function to perform communication via a network and a function to perform the NFC communication. The details of the management place terminal 5 are described later.

The center 6 is a server, for example. The center 6 performs communication with the mobile phone 4 and the management place terminal 5 via a network, and performs communication with the vehicle-side unit 1 via a network. According to the operation input received from a service user by means of the mobile phone 4 and the management place terminal 5, the center 6 makes a reservation of the service vehicle to be used by the service user, in cooperation with the mobile phone 4 and the management place terminal 5. The center 6 may include a server or may include multiple servers. The details of the center 6 are described later.

(Configuration of Smart Ring 3)

Figure 2:
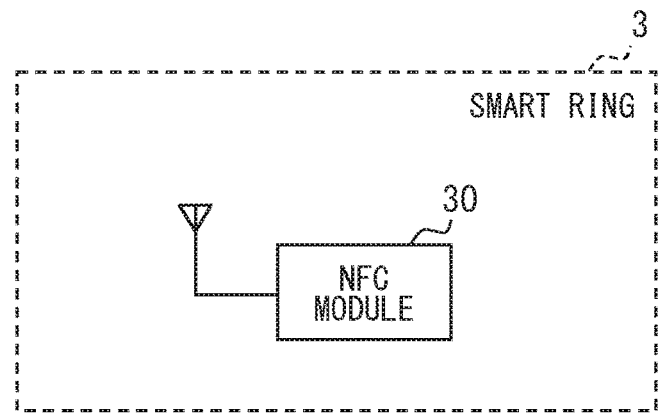
FIG. 2 is a diagram illustrating an example of a configuration of a smart ring.

Next, configuration of the smart ring 3 is explained with reference to FIG. 2. As illustrated in FIG. 2, the smart ring 3 includes an NFC module 30.

The NFC module 30 is a communication module for performing the NFC communication. The NFC module 30 performs the NFC communication within a communication range with each of an NFC module 16 (to be described later) of the vehicle-side unit 1, an NFC module 41 (to be described later) of the mobile phone 4, and an NFC module 51 (to be described later) of the management place terminal 5. The NFC module 30 corresponds to a ring-side short-range communication unit. For the purpose of power saving of the smart ring 3, it is preferable for the NFC module 30 to employ a passive type communication module which functions in response to an electric power supply utilizing magnetic field induced by a communication module of the other party of the NFC communication.

The NFC module 30 includes a memory that stores in advance the identification information (hereinafter referred to as a ring ID) unique to an individual smart ring 3. When accessed from a communication module of the other party of the NFC communication, the NFC module 30 transmits the ring ID stored in the memory to the communication module of the other party.

(Configuration of Mobile Phone 4)

Figure 3:
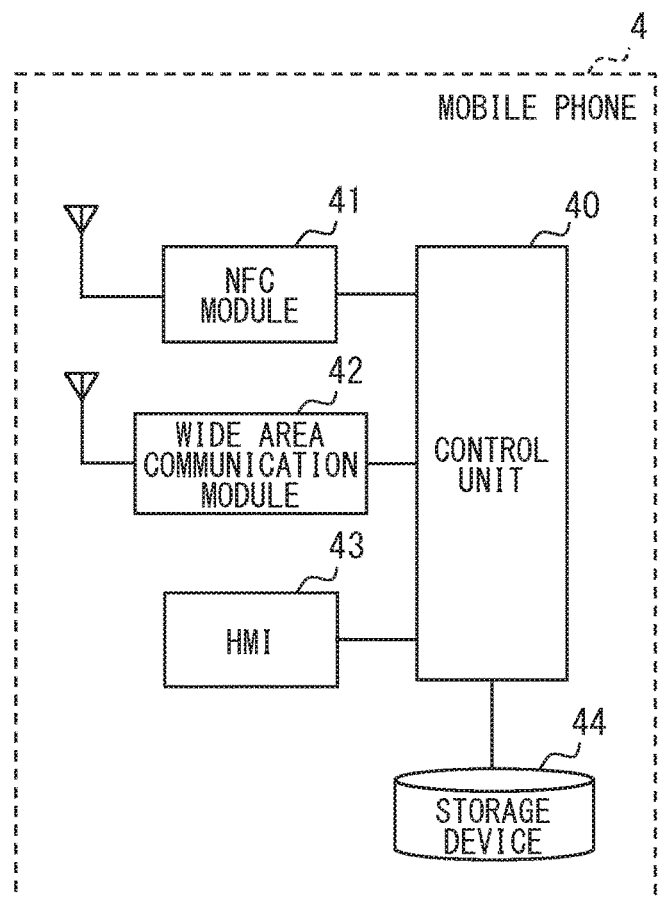
FIG. 3 is a diagram illustrating an example of a configuration of a mobile phone.

Next, the configuration of the mobile phone 4 is explained with reference to FIG. 3. As illustrated in FIG. 3, the mobile phone 4 includes a control unit 40, the NFC module 41, a wide area communication module 42, an HMI (Human Machine Interface) 43, and a storage device 44.

The NFC module 41 is a communication module for performing the NFC communication and has a function as a reader. The NFC module 41 accesses the smart ring 3 in a communication range by the NFC communication, and receives a ring ID from the smart ring 3. The NFC module 41 corresponds to a terminal-side short-range communication unit.

The wide area communication module 42 is a communication module for performing communication via a network, such as the Internet. The wide area communication module 42 performs communication with the center 6 via a network. The HMI 43 receives the input operation from a service user, or presents information to the service user. The wide area communication module 42 corresponds to a terminal-side wide area communication unit.

The control unit 40 includes a processor and a memory and executes various kinds of processing by executing a control program stored in the memory. The memory referred to here is a non-transitory tangible storage medium which stores a computer-readable program and data in a non-transitory manner. The non-transitory tangible storage medium is realized by a semiconductor memory, etc.

When an operation input unit of the HMI 43 receives an operation input that associates the mobile phone 4 of the service user with the smart ring 3 of the service user and when a ring ID from the smart ring 3 is received by the NFC module 41, the control unit 40 stores the received ring ID to the storage device 44. The smart ring 3 in which the ring ID is stored in the storage device 44 is registered to the mobile phone 4 as an authorized smart ring 3 for the service user of the mobile phone 4. The storage device 44 is an electrically-rewritable nonvolatile memory.

When the authorized smart ring 3 is already registered and when the operation input unit of the HMI 43 receives the operation input indicating that the reservation for a service vehicle is to be made, the control unit 40 accesses the center 6 via the wide area communication module 42 and makes a reservation for the service vehicle. The control unit 40 corresponds to a reservation unit. As an example, the service user operates an exclusive browser of the reservation for a service vehicle via the operation input unit of the HMI 43 to access the center 6, and selects the reservation items displayed on the exclusive browser of the reservation in order to make the reservation for the service vehicle. The selection of the reservation items includes selection of a service vehicle for which the reservation is made, selection of the time period of use of the service vehicle, or the combination of a departure point and a destination point. When making the reservation for the service vehicle, the control unit 40 transmits the ring ID stored in the storage device 44 from the wide area communication module 42 to the center 6.

When the reservation is made for the service vehicle, the control unit 40 stores the information on the reservation result in the storage device 44, and displays the information on the reservation result on a display device of the HMI 43 according to the operation input received by the operation input unit of the HMI 43. According to the present configuration, it is possible for the service user to confirm the reservation result at a desired time point. As displaying of the information on the reservation result, the appearance and/or the symbol of a license plate of the service vehicle for which the reservation has been made may be displayed, or the reserved time period of use or the combination of the departure point and the destination point of the reserved service vehicle may be displayed.

(Configuration of Management Place Terminal 5)

Figure 4:
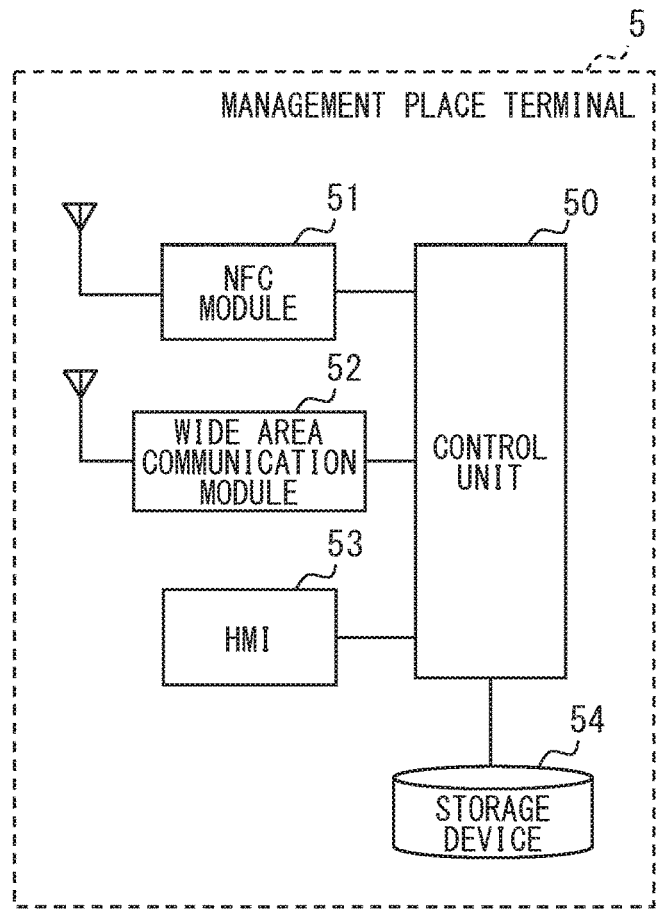
FIG. 4 is a diagram illustrating an example of a configuration of a management place terminal.

Next, the configuration of the management place terminal 5 is explained with reference to FIG. 4. As illustrated in FIG. 4, the management place terminal 5 includes a control unit 50, the NFC module 51, a wide area communication module 52, an HMI 53, and a storage device 54.

The NFC module 51 is a communication module for performing the NFC communication, and has a function as a reader. The NFC module 51 accesses the smart ring 3 within a communication range by the NFC communication, and receives a ring ID from the smart ring 3. The NFC module 51 corresponds to a terminal-side short-range communication unit.

The wide area communication module 52 is a communication module for performing communication via a network, such as the Internet. The wide area communication module 52 performs communication with the center 6 via a network. The HMI 53 receives the input operation from a service user, or presents information to the service user. The wide area communication module 52 corresponds to a terminal-side wide area communication unit.

The control unit 50 includes a processor and a memory and executes various kinds of processing by executing a control program stored in the memory. The memory referred to here is a non-transitory tangible storage medium which stores a computer-readable program and data in a non-transitory manner. The non-transitory tangible storage medium is realized by use of a semiconductor memory, etc.

When an operation input unit of the HMI 53 receives an operation input that associates the management place terminal 5 with the smart ring 3 of the service user and when a ring ID from the smart ring 3 is received by the NFC module 51, the control unit 50 stores the received ring ID to the storage device 54. The smart ring 3 in which the ring ID is stored in the storage device 54 is registered to the management place terminal 5 as an authorized smart ring 3 for the management place terminal 5. The storage device 54 is an electrically-rewritable nonvolatile memory.

When the authorized smart ring 3 is already registered and when the operation input unit of the HMI 53 receives the operation input indicating that the reservation for a service vehicle is to be made, the control unit 50 accesses the center 6 via the wide area communication module 52 and makes a reservation for the service vehicle, as is the case with the control unit 40. The control unit 50 corresponds to a reservation unit. When making the reservation for the service vehicle, the control unit 50 transmits the ring ID stored in the storage device 54 from the wide area communication module 52 to the center 6.

The reservation of a service vehicle is made by the mobile phone 4, or by the management place terminal 5. However, in the car share in which a privately-owned vehicle is lent out to the others, it is preferable to employ a configuration in which the reservation of a service vehicle is made by the mobile phone 4.

(Configuration of Center 6)

Figure 5:
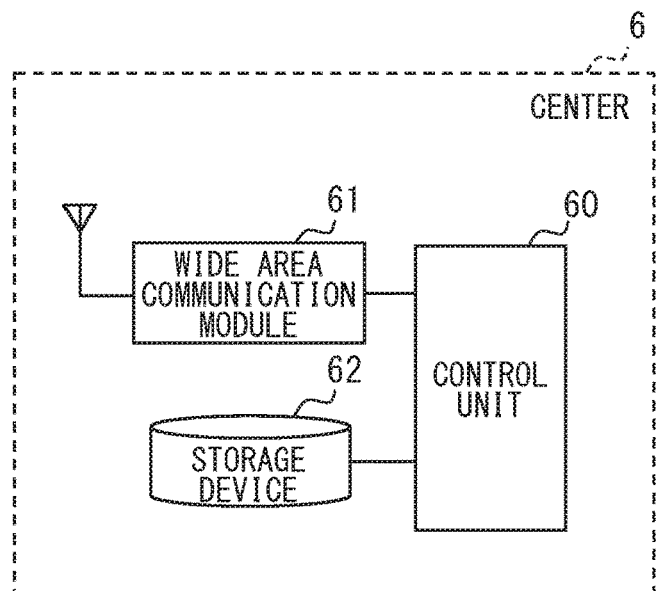
FIG. 5 is a diagram illustrating an example of a configuration of a center.

Next, the configuration of the center 6 is explained with reference to FIG. 5. As illustrated in FIG. 5, the center 6 includes a control unit 60, a wide area communication module 61, and a storage device 62.

The wide area communication module 61 is a communication module for performing communication via a network, such as the Internet. The wide area communication module 61 performs, via a network, communication with the mobile phone 4, communication with the management place terminal 5, or communication with the vehicle-side unit 1.

The control unit 60 includes a processor and a memory and executes various kinds of processing by executing a control program stored in the memory. The memory referred to here is a non-transitory tangible storage medium which stores a computer-readable program and data in a non-transitory manner. The non-transitory tangible storage medium is realized by use of a semiconductor memory, etc.

The control unit 60 makes a reservation for a service vehicle via the communication terminal, such as the mobile phone 4 or the management place terminal 5. As an example, the service user operates the reservation exclusive browser of the service vehicle by use of the communication terminal in order to access the center 6, and selects the reservation item displayed on the reservation exclusive browser to make the reservation for the service vehicle. When the reservation of the service vehicle is made, the control unit 60 associates the reservation information with the ring ID transmitted from the communication terminal, such as the mobile phone 4 or the management place terminal 5, and stores the information in the storage device 62. The reservation information includes, for example, an identifier for identifying the service vehicle for which the reservation has been made (hereinafter referred to as a vehicle ID), a time period of use of the service vehicle, or the combination of a departure point and a destination point.

Based on the vehicle ID included in the reservation information, the control unit 60 transmits the reservation information and the ring ID associated with the reservation information, from the wide area communication module 61 to the vehicle-side unit 1 of the service vehicle corresponding to the vehicle ID.

(Configuration of Vehicle-Side Unit 1)

Figure 6:
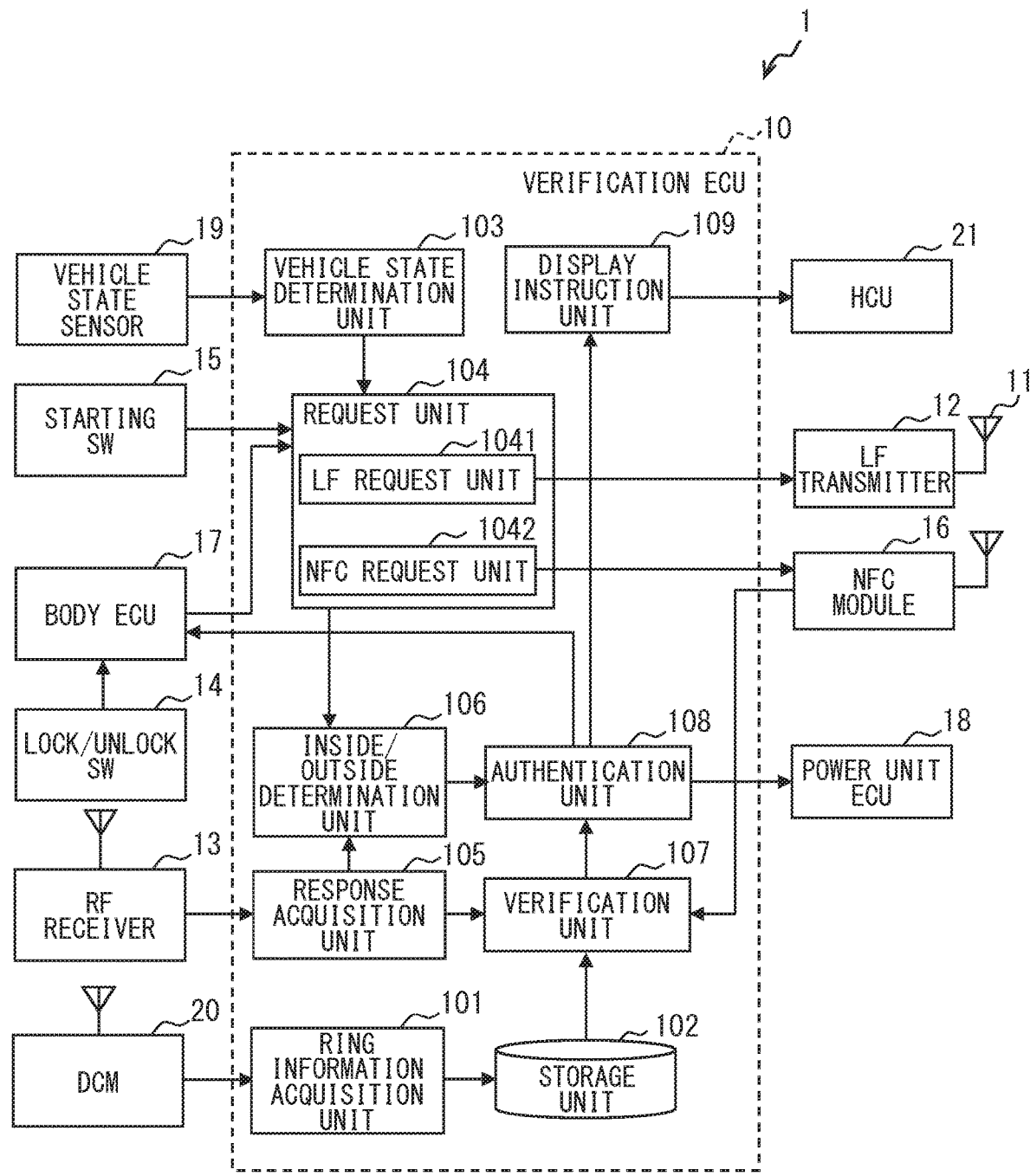
FIG. 6 is a diagram illustrating an example of a configuration of a vehicle-side unit.

Next, an example of the configuration of the vehicle-side unit 1 is explained with reference to FIG. 6. As illustrated in FIG. 6, the vehicle-side unit 1 includes a verification ECU 10, an LF transmission antenna 11, an LF transmitter 12, an RF receiver 13, a lock/unlock switch (hereinafter referred to as SW) 14, a starting SW 15, the NFC module 16, a body ECU 17, a power unit ECU 18, a vehicle state sensor 19, a DCM (Data Communication Module) 20, and an HCU (Human Machine Interface Control Unit) 21.

The LF transmission antenna 11 transmits a signal by means of a radio wave of the LF band. A plurality of LF transmission antennas 11 may be provided in the service vehicle. For example, the LF transmission antenna 11 may be provided in the vicinity of the door of a driver's seat, in the vicinity of the door of a front passenger's seat, in the vicinity of a trunk door, in a passenger compartment, etc. Hereinafter, the LF transmission antenna 11 provided outside the vehicle, such as in the vicinity of the door of a driver's seat, in the vicinity of the door of a front passenger's seat, and in the vicinity of a trunk door, is called a vehicle-exterior LF transmission antenna 11, and the LF transmission antenna 11 provided in the passenger compartment is called a vehicle-interior LF transmission antenna 11.

The LF transmitter 12 causes the LF transmission antenna 11 to transmit a signal. The LF transmitter 12 is an IC for example, and transmits a signal from the LF transmission antenna 11 according to a request from the verification ECU 10. For example, one LF transmitter 12 is provided for the plurality of LF transmission antennas 11. The RF receiver 13 receives a response signal transmitted from the portable device 2 by means of a radio wave in the RF band.

The lock/unlock SW 14 requests locking and unlocking of doors of the service vehicle, such as a door of a driver's seat, a door of a front passenger's seat, a door of a backseat, and a trunk door. The lock/unlock SW 14 may be provided on the outer door handle of the service vehicle or on a rear bumper. As the lock/unlock SW 14, a touch switch or a mechanical button switch for example may be employed. The starting SW 15 is provided ahead of a driver's seat, for example, and requests starting of the driving source of the service vehicle. As the starting SW 15, a mechanical button switch for example may be employed.

The NFC module 16 is a communication module for performing the NFC communication, and has a function as a reader. The NFC module 16 accesses the smart ring 3 in a communication range by the NFC communication, and receives a ring ID from the smart ring 3. The NFC module 16 is provided in the service vehicle. The NFC module 16 corresponds to a short-range communication module. The NFC module 16 is provided in the position where the NFC communication is possible with the smart ring 3 worn on a service user's finger, in the case of operation for locking and unlocking of the service vehicle and in the case of operation for starting of a driving source. That is, the NFC module 16 is provided in the vicinity of the lock/unlock SW 14 or in the vicinity of the starting SW 15.

In the example of the present embodiment, it is assumed that the NFC module 16 is provided in the vicinity of the lock/unlock SW 14 of the outer door handle of the service vehicle and in the vicinity of the starting SW 15 in the passenger compartment, respectively. Hereinafter, the NFC module 16 provided in the vicinity of the lock/unlock SW 14 is called a vehicle-exterior NFC module 16, and the NFC module 16 provided in the vicinity of the starting SW 15 is called a vehicle-interior NFC module 16. "Vicinity" described here means a distance shorter than the maximum communication range available in the NFC communication which the NFC module 16 performs. The NFC communication between the vehicle-side unit 1 and the smart ring 3 is wireless communication that is different from the wireless communication between the vehicle-side unit 1 and the portable device 2 and has the maximum communication range shorter than in the wireless communication between the vehicle-side unit 1 and the portable device 2.

The body ECU 17 outputs a driving signal for controlling locking and unlocking of each vehicle door to a door lock motor provided in each vehicle door to perform the locking and unlocking of each vehicle door. The body ECU 17 outputs a locking signal to a door lock motor and performs the locking of a door lock, and, outputs an unlocking signal to the door lock motor and performs the unlocking of the door lock. The body ECU 17 is connected to the lock/unlock SW 14 provided in the outer door handle of each vehicle door, acquires a signal of the lock/unlock SW 14, and detects the operation of the lock/unlock SW 14. In addition, the body ECU 17 is connected to a courtesy SW regarding each vehicle door, acquires a signal of the courtesy SW according to the opening and closing of each vehicle door, and detects the opening and closing of each vehicle door.

The power unit ECU 18 is an electronic controller which controls a driving source such as an internal-combustion engine or a motor-generator of the service vehicle. When the power unit ECU 18 acquires a starting enabling signal of the driving source from the verification ECU 10, the power unit ECU 18 starts the driving source such as the internal-combustion engine or the motor-generator of the service vehicle.

The vehicle state sensor 19 is a sensor group for detecting the information regarding the behavior of the service vehicle, such as the traveling state and the operation state of the service vehicle. The vehicle state sensor 19 includes a vehicle speed sensor to detect vehicle speed, a shift position sensor to detect a shift position, and a brake switch to detect brake operation, for example.

The DCM 20 is an in-vehicle communication module and performs communication with the center 6 via a network. The DCM 20 receives the reservation information transmitted from the center 6 where the reservation for the service vehicle has been performed, and the ring ID associated with the reservation information. The DCM 20 corresponds to a wide area communication module. The HCU 21 is an electronic controller to control the HMI of the service vehicle, and prepares a display on the display device provided in the service vehicle.

The verification ECU 10 includes a processor, a memory, an I/O, and a bus that couples these parts. The verification ECU 10 executes a control program stored in the memory, and accordingly executes various kinds of processing regarding authentication in the service vehicle. The memory referred to here is a non-transitory tangible storage medium which stores a computer-readable program and data in a non-transitory manner. The non-transitory tangible storage medium is realized by a semiconductor memory or a magnetic disk.

(Configuration of Verification ECU 10)

Next, an example of the configuration of the verification ECU 10 is explained with reference to FIG. 6. As illustrated in FIG. 6, the verification ECU 10 includes a ring information acquisition unit 101, a storage unit 102, a vehicle state determination unit 103, a request unit 104, a response acquisition unit 105, an inside/outside determination unit 106, a verification unit 107, an authentication unit 108, and a display instruction unit 109, each as a functional block. The verification ECU 10 corresponds to an in-vehicle device. A part or all of the function that the verification ECU 10 executes may be configured hardware-wise by employing one or more ICs (Integrated Circuits). A part or all of the functional blocks included in the verification ECU 10 may be realized by the combination of the execution of the software by a processor and hardware members.

The ring information acquisition unit 101 acquires the reservation information of the service vehicle received by the DCM 20, and the ring ID associated with the reservation information. The ring information acquisition unit 101 corresponds to a reception information acquisition unit. The ring information acquisition unit 101 stores the acquired ring ID in the storage unit 102 as an authorized ring ID with restriction, based on the acquired reservation information. The storage unit 102 is an electrically-rewritable nonvolatile memory, for example. As an example of the restriction, when the time period of use of the service vehicle is included in the reservation information for example, the period indicated by the time period of use is stored in the storage unit 102, as a valid period of the authorized ring ID. When the combination of a departure point and a destination point of the service vehicle is included in the reservation information for example, the interval from the departure point to the destination point is stored in the storage unit 102 as the valid interval of the authorized ring ID.

The storage unit 102 holds the storage as the authorized ring ID in the valid period or the valid interval, and when the valid period or the valid interval are exceeded, the storage unit 102 may delete the storage as the authorized ring ID. The determination of whether the valid period is satisfied may be made by count by means of a timer circuit for example. The determination of whether the valid interval is satisfied may be made based on the vehicle position successively positioned on a digital map by means of a locator.

It is assumed that the storage unit 102 stores the information for authentication on the portable device 2, in addition to the ring ID acquired by the ring information acquisition unit 101. The information for authentication on the portable device 2 may be a code of the authorized portable device 2, for example, or may be a secret key employed in the common key encryption system when the challenge response system is employed.

The vehicle state determination unit 103 determines the state of the vehicle based on the sensing result regarding the vehicle state detected by the vehicle state sensor 19. For example, the vehicle state determination unit 103 determines whether the vehicle is parked or not, based on the vehicle speed detected by the vehicle speed sensor and the shift position detected by the shift position sensor. The vehicle state determination unit 103 also determines whether the brake operation is performed based on a signal of the brake switch.

The request unit 104 includes an LF request unit 1041 and an NFC request unit 1042. According to the signal inputted from the body ECU 17 or the starting SW 15, and the vehicle state determined by the vehicle state determination unit 103, the request unit 104 causes the LF transmitter 12 to transmit a request signal, or causes the NFC module 16 to perform the NFC communication. The LF request unit 1041 turns on the communication function to perform the wireless communication (hereinafter referred to as LF communication) by the LF transmitter 12 in order to transmit a request signal. The LF request unit 1041 corresponds to a request transmission unit. The LF communication can be expressed as long wave communication in another way. Meanwhile, the NFC request unit 1042 turns on the communication function to perform the NFC communication by the NFC module 16. The NFC request unit 1042 corresponds to a vehicle-side short-range communication unit.

For example, when the vehicle state determination unit 103 determines that the subject vehicle is parked and when the body ECU 17 does not detect that the lock/unlock SW 14 is operated, the LF request unit 1041 turns on intermittently the communication function of the LF transmitter 12 to transmit a request signal from the vehicle-exterior LF transmission antenna 11. According to the present setting, a request signal is transmitted intermittently from the vehicle-exterior LF transmission antenna 11.

Meanwhile, when the vehicle state determination unit 103 determines that the subject vehicle is parked and when the body ECU 17 detects that the lock/unlock SW 14 is operated, the NFC request unit 1042 turns on intermittently the communication function of the vehicle-exterior NFC module 16. When the body ECU 17 detects that the lock/unlock SW 14 is operated, it is preferable for the NFC request unit 1042 to turn on continuously the communication function of the vehicle-exterior NFC module 16 for a predetermined period longer than the period in the case of turning on intermittently.

Figure 7:
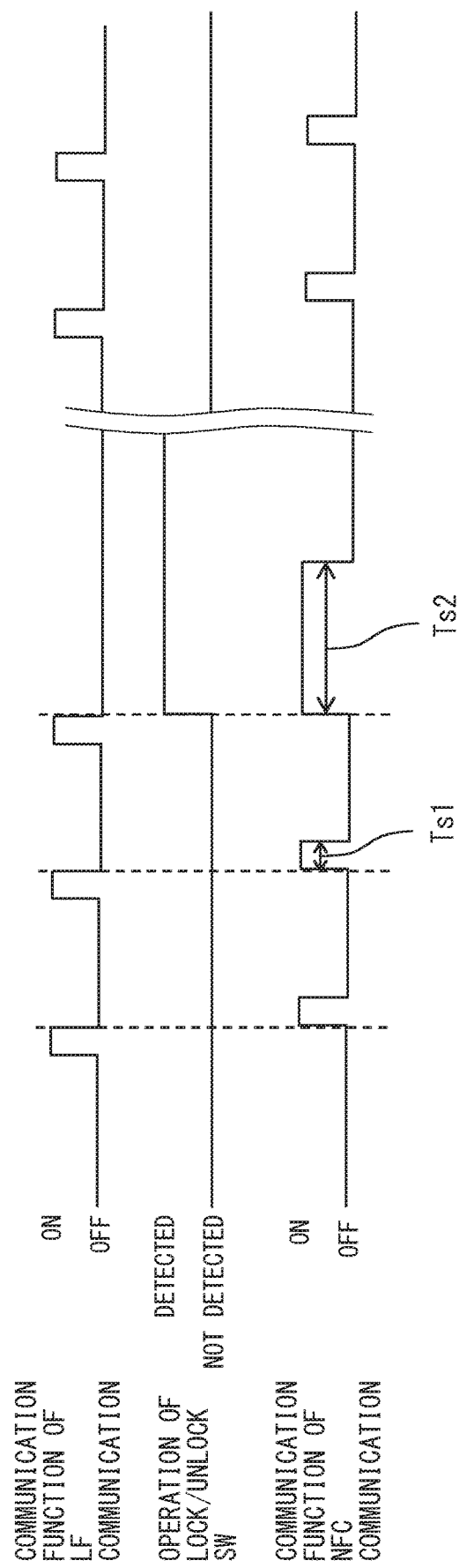
FIG. 7 is a diagram illustrating an example of exclusive control which turns on exclusively one of a communication function to perform LF communication and a communication function to perform NFC communication.

The smart ring 3 is worn on a service user's finger. Therefore, when the service user operates the lock/unlock SW 14 with a finger, the smart ring 3 is placed in a location in the vicinity of the vehicle-exterior NFC module 16. Therefore, when the body ECU 17 detects that the lock/unlock SW 14 is operated, the communication function of the vehicle-exterior NFC module 16 is turned on continuously for the predetermined period, thereby making it possible to ensure communication with the smart ring 3 even when the NFC communication with a short communication range is employed, The LF request unit 1041 and the NFC request unit 1042 perform exclusive control so that the communication function to perform the LF communication in the LF transmitter 12 and the communication function to perform the NFC communication in the NFC module 16 may be turned on exclusively. The exclusive control described here is desirable in order to avoid mutual communication interference. Here, an example of the exclusive control which exclusively turns on one of the communication function to perform the LF communication and the communication function to perform the NFC communication is explained with reference to FIG. 7. FIG. 7 illustrates an example in the case of exclusively turning on one of the communication function of the LF communication in the LF transmitter 12 to transmit a request signal from the vehicle-exterior LF transmission antenna 11, and the communication function of the NFC communication in the vehicle-exterior NFC module 16. FIG. 7 illustrates the changes accompanying the time progress of: turning on/off of the communication function to perform the LF communication; detecting/non-detecting of the operation of the lock/unlock SW 14; and turning on/off of the communication function to perform the NFC communication.

First, before the lock/unlock SW 14 is operated, as illustrated in FIG. 7, the communication function to perform the LF communication and the communication function to perform the NFC communication are turned on intermittently at shifted time point so that the turned on period of each other may not overlap. Next, when the lock/unlock SW 14 is operated, as illustrated in FIG. 7, the communication function to perform the NFC communication is turned on continuously for a predetermined period (Ts2 in FIG. 7) which is longer than the period in the case of turning on intermittently (Ts1 in FIG. 7). Meanwhile, the communication function to perform the LF communication is turned off at least for the period when the communication function to perform the NFC communication is turned on.

It is also preferred for the LF request unit 1041 and the NFC request unit 1042 to perform exclusive control so that the communication function of the LF communication in the LF transmitter 12 to transmit a request signal from the vehicle-interior LF transmission antenna 11, and the communication function of the NFC communication in the vehicle-interior NFC module 16 may be turned on exclusively, in the same manner as in the example illustrated in FIG. 7. In more detail, the same scheme may be applied by replacing the detecting/non-detecting of the operation of the lock/unlock SW 14 illustrated in FIG. 7 to the detecting/non-detecting of the operation of the starting SW 15.

When the body ECU 17 detects that the vehicle door is opened or the vehicle state determination unit 103 detects the brake operation, for example, the LF request unit 1041 turns on intermittently the communication function of the LF transmitter 12 to transmit a request signal from the vehicle-interior LF transmission antenna 11. According to the present setting, a request signal is transmitted intermittently from the vehicle-interior LF transmission antenna 11.

Meanwhile, when the body ECU 17 detects that the vehicle door is opened or the vehicle state determination unit 103 detects the brake operation, for example, the NFC request unit 1042 turns on intermittently the communication function of the vehicle-interior NFC module 16. When the signal indicating that the starting SW 15 is operated is inputted, it is preferable for the NFC request unit 1042 to turn on continuously the communication function of the vehicle-interior NFC module 16 for a predetermined period longer than the period in the case of turning on intermittently.

The smart ring 3 is worn on a service user's finger. Therefore, when the service user operates the starting SW 15 with the finger, the smart ring 3 is placed in a location in the vicinity of the vehicle-interior NFC module 16. Accordingly, when the signal is inputted indicating that the starting SW 15 is operated, the communication function of the vehicle-interior NFC module 16 is turned on continuously for the predetermined period, thereby making it possible to ensure communication with the smart ring 3 even when the NFC communication with a short communication range is employed.

The response acquisition unit 105 acquires a response signal received from the portable device 2 by means of the RF receiver 13, in response to a request signal transmitted from the LF transmission antenna 11. The response acquisition unit 105 outputs a code for verification included in the response signal, to the verification unit 107.

The inside/outside determination unit 106 determines whether the portable device 2 as the transmitting source of the response signal acquired by the RF receiver 13 is located inside or the outside of the passenger compartment. As an example, when a request signal is transmitted from the vehicle-interior LF transmission antenna 11 and a response signal is received from the portable device 2, it is determined that the portable device 2 is located inside of the passenger compartment. Meanwhile, when a request signal is transmitted from the vehicle-exterior LF transmission antenna 11 and a response signal is received from the portable device 2, and when a request signal is transmitted from the vehicle-interior LF transmission antenna 11 and a response signal is not received from the portable device 2, it is determined that the portable device 2 is located outside of the passenger compartment.

When the response acquisition unit 105 acquires a response signal, the verification unit 107 performs verification, employing the code included in the response signal acquired by the response acquisition unit 105 and the information for authentication on the portable device 2 stored in the storage unit 102. When the information for authentication on the portable device 2 is the code of the authorized portable device 2, the verification is performed between the code included in the response signal and the code of the authorized portable device 2. When the challenge response system is employed, the verification is performed between the encryption code included in the response signal acquired by the RF receiver 13 and the encryption code obtained by encrypting the code of the challenge signal transmitted from the LF transmission antenna 11 with the secret key stored in the storage unit 102.

When a ring ID is received from the smart ring 3 by the NFC module 16, the verification unit 107 performs verification between the ring ID received by the NFC module 16 and the authorized ring ID stored in the storage unit 102.

FIG. 7 illustrates the configuration in which the NFC request unit 1042 turns on continuously the communication function to perform the NFC communication for a predetermined period when the lock/unlock SW 14 is operated. However, the configuration is not necessarily limited to the above. For example, the response signal from the portable device 2 is acquired by the RF receiver 13 by the time the lock/unlock SW 14 is operated, and the verification using the code included in the response signal is performed in the verification unit 107. In this case, the NFC request unit 1042 does not turn on the communication function for performing the NFC communication even when the lock/unlock SW 14 is operated.

According to the present configuration, when the authentication regarding the use of the vehicle is performed by the verification between the portable device 2 and the vehicle-side unit 1 and there is no necessity for the verification between the smart ring 3 and the vehicle-side unit 1, it is not necessary to turn on the communication function to perform the NFC communication. Therefore, it is possible to reduce the useless power consumption of the NFC module 16.

The authentication unit 108 performs the authentication when the inside/outside determination unit 106 determines that the portable device 2 is located outside of the passenger compartment and when the verification unit 107 performs the verification about the portable device 2. When the authentication is performed and when the door lock of the vehicle is in the locked state and the operation of the lock/unlock SW 14 is detected, the body ECU 17 outputs an unlocking signal to the door lock motor to unlock the door of the service vehicle. Meanwhile, when the authentication is performed and when the door lock of the vehicle is in the unlocked state and the operation of the lock/unlock SW 14 is detected, the body ECU 17 outputs a locking signal to the door lock motor to lock the door of the service vehicle.

The authentication unit 108 performs the authentication when the inside/outside determination unit 106 determines that the portable device 2 is located inside of the passenger compartment and when the verification unit 107 performs the verification about the portable device 2. The power unit ECU 18 starts the driving source when the authentication is performed and when the signal indicative of the operation of the starting SW 15 is acquired.

In addition, the authentication unit 108 performs the authentication also when the verification unit 107 performs the verification about the ring ID received by the vehicle-exterior NFC module 16. When the authentication is performed and when the door lock of the vehicle is in the locked state and the operation of the lock/unlock SW 14 is detected, the body ECU 17 outputs an unlocking signal to the door lock motor to unlock the door of the service vehicle. Meanwhile, when the authentication is performed and when the door lock of the vehicle is in the unlocked state and the operation of the lock/unlock SW 14 is detected, the body ECU 17 outputs a locking signal to the door lock motor to lock the door of the service vehicle. The authentication unit 108 performs the authentication also when the verification unit 107 performs the verification about the ring ID received by the vehicle-interior NFC module 16 and when the signal indicative of the operation of the starting SW 15 is acquired. The power unit ECU 18 starts the driving source when the authentication is performed.

The display instruction unit 109 causes the display device of the service vehicle to perform a display indicating that it is the use by an authorized service user when the authentication unit 108 performs the authentication based on the fact that the verification unit 107 performs the verification about the ring ID received by the vehicle-exterior NFC module 16. As an example, the display instruction unit 109 instructs the HCU 21 to perform the display indicating that it is the use by an authorized service user (hereinafter referred to as an identification display), to the display device of the service vehicle.

According to the present configuration, when the service vehicle is employed for the ride share, the identification display helps the fellow passenger to recognize that it is the use of the authorized service user. In the present embodiment, the door of the service vehicle is unlocked automatically when the authentication unit 108 performs the authentication based on the fact that the verification unit 107 performs the verification about the ring ID received by the NFC module 16. However, it is also preferable to employ a configuration in which the door of the service vehicle is not unlocked automatically. When the identification display is performed in such a configuration, it is possible for the fellow passenger to confirm that it is the use of the authorized service user by the identification display and to unlock manually the door of the service vehicle. Therefore, it is not necessary for the fellow passenger to recognize the authorized service user from a facial portrait, etc. Therefore, convenience improves more.

It is preferable to employ a configuration in which the display instruction unit 109 does not perform the identification display when the authentication unit 108 performs the authentication based on the fact that the verification unit 107 performs the verification about the code included in the response signal acquired by the response acquisition unit 105. According to the present configuration, in separate usage in which the manager employs the portable device 2 and the service user employs the smart ring 3, it is possible to avoid the troublesomeness that the identification display is performed even when the manager utilizes the service vehicle.

(Authentication Employing the Smart Ring 3 in the Vehicle Authentication System 7)

Next, with reference to the sequence diagram illustrated in FIG. 8, an example of the flow of the authentication employing the smart ring 3 in the vehicle authentication system 7 is explained. The sequence diagram illustrated in FIG. 8 explains an example of the case where the service user makes a reservation for the service vehicle employing the mobile phone 4.

First, the operation input unit of the HMI 43 of the mobile phone 4 receives an operation input (hereinafter referred to as a registration operation) indicating that the mobile phone 4 of the service user and the smart ring 3 of the service user are to be associated with each other (t1). By bringing the smart ring 3 worn by a service user close to the mobile phone 4 up to the communication range of the NFC communication, the NFC communication is performed between the NFC module 30 of the smart ring 3 and the NFC module 41 of the mobile phone 4. By the NFC communication, the NFC module 41 receives a ring ID from the smart ring 3 (t2). In the mobile phone 4 which has received the ring ID by means of the NFC module 41, the control unit 40 stores the received ring ID in the storage device 44, and accordingly, the ring ID of the smart ring 3 of the service user is registered to the mobile phone 4 (t3).

The operation input unit of the HMI 43 of the mobile phone 4 receives an operation input (hereinafter referred to as a reservation operation) indicating that the reservation for the service vehicle is to be performed (t4). For example, in the reservation operation, the reservation exclusive browser of the service vehicle is operated to access the center 6 via the wide area communication module 42 and the network. Then, the selection of the reservation item to be displayed on the reservation exclusive browser and the transmission of the ring ID stored in the storage device 44 to the center 6 are performed (t5).

In the center 6, by performing the selection of the reservation item to be displayed on the reservation exclusive browser, the reservation for the service vehicle is made (t6). When the reservation of the service vehicle is made, the control unit 60 of the center 6 stores the ring ID transmitted from the mobile phone 4 and the reservation information with being associated with each other in the storage device 62. Based on the vehicle ID included in the reservation information, the control unit 60 transmits the reservation information and the ring ID associated with the reservation information to the vehicle-side unit 1 of the service vehicle corresponding to the vehicle ID, from the wide area communication module 61 via the network. Then, in the vehicle-side unit 1, the ring information acquisition unit 101 acquires the reservation information and the ring ID that are transmitted from the center 6 via the DCM 20 (t7).

Based on the acquired reservation information, the ring information acquisition unit 101 of the vehicle-side unit 1 stores the acquired ring ID in the storage unit 102 as the authorized ring ID with the restriction (t8). Subsequently, the NFC request unit 1042 turns on the communication function to perform the NFC communication in the NFC module 16 (t9). When the lock/unlock SW 14 or the starting SW 15 is operated at the time point at which the communication function to perform the NFC communication in the NFC module 16 is turned on, the smart ring 3 worn by the service user approaches the NFC module 16 up to the communication range of the NFC communication. According to the present setting, the NFC communication is performed between the NFC module 30 of the smart ring 3 and the NFC module 16 of the vehicle-side unit 1. Then, the NFC module 16 receives the ring ID from the smart ring 3 through the NFC communication (t10).

Subsequently, the verification unit 107 of the vehicle-side unit 1 performs verification between the ring ID received by the NFC module 16 and the authorized ring ID stored in the storage unit 102 (t11). When the smart ring 3 is the one worn by the service user who has made the reservation for the service vehicle, the ring ID is stored in the storage unit 102 as the authorized ring ID. Therefore, the verification of the ring ID is established. The authentication unit 108 performs the authentication when the verification unit 107 performs the verification about the ring ID received by the NFC module 16 (t12).

Here, the explanation is made for the example of the case where the service user makes the reservation for the service vehicle employing the mobile phone 4. However, the same applies to the case where the service user makes the reservation for the service vehicle employing the management place terminal 5. In more detail, the processing by the mobile phone 4 may be replaced to the processing by the management place terminal 5.

Summary of First Embodiment

According to the configuration of the first embodiment, when the communication terminal, such as the mobile phone 4 or the management place terminal 5, makes a reservation for use of a service vehicle, the ring ID unique to the smart ring 3 is transmitted to the DCM 20 of the service vehicle, via the communication terminal and the center 6. Accordingly, the verification ECU 10 of the service vehicle of which the user makes a reservation for the use can acquire the ring ID unique to the smart ring 3 worn on the service user's finger, by means of the ring information acquisition unit 101 via the DCM 20. The authentication unit 108 performs the authentication regarding the use of the service vehicle, based on the verification between the ring ID that the ring information acquisition unit 101 acquires and the ring ID that the NFC module 16 of the service vehicle receives from the smart ring 3. Therefore, when reservation is made for use of different service vehicles using the same smart ring 3, it is possible to use these different service vehicles. Accordingly, it is possible for a service user to use a plurality of service vehicles without changing the device that has the function of the electronic key.

The NFC module 16 is provided in the communication range of the short-range wireless communication from the part operated with a service user's finger when using the service vehicle, such as the lock/unlock SW 14 and the starting SW 15 of the service vehicle. That is, the NFC module 16 is provided at a position to include the lock/unlock SW 14 or the starting SW 15 operated by the finger of the user in the communication range of the short-range wireless communication. Accordingly, in the course of operating the part which the service user operates with a finger wearing the smart ring 3 when using the service vehicle, it is possible for the NFC module 16 to receive the ring ID from the NFC module 30 of the smart ring 3. Accordingly, it is possible to perform the authentication without the time and effort to take out a device having the function of the electronic key from a bag or a pocket of clothing every time to start or operate the service vehicle when using the service vehicle. Therefore, it is possible to improve the convenience in the authentication at the time of using the service vehicle.

Furthermore, the NFC module 16 and the NFC module 30 employ the NFC communication for the exchange of the ring ID. The NFC communication has the very short communication range; therefore, interception of the communication by a third party is difficult. Therefore, it is possible to enhance the nature of security in the authentication at the time of using the service vehicle. As a result, a user is enabled to utilize a plurality of vehicles, without changing a device that has the function of an electronic key, and it is possible to enhance the nature of security and to improve the convenience in the authentication at the time of using the vehicle.

The communication range of the NFC communication is very short, therefore, even when the service vehicle is employed for the ride share, in the authentication about a service user who is newly going to get on board, the NFC communication between the smart ring 3 of the service user who is already on board and the NFC module 16 is not performed. Accordingly, it is very hard for the authentication to be performed accidentally.

According to the configuration of the first embodiment, both the authentication employing the portable device 2 when using the service vehicle and the authentication employing the smart ring 3 when using the service vehicle are possible. Accordingly, a desired vehicle among a plurality of service vehicles can be selected without changing the smart ring 3. The service vehicle provided by the manager is available by means of the portable device 2 without performing the reservation for use.

Second Embodiment

The first embodiment describes the example in which the NFC request unit 1042 has turned on intermittently the communication function of the vehicle-exterior NFC module 16 before the lock/unlock SW 14 is operated, and the example in which the NFC request unit 1042 has turned on intermittently the communication function of the NFC module 16 before the starting SW 15 is operated. However, the configuration is not necessarily limited to such examples. For example, it is preferable to employ a configuration in which the NFC request unit 1042 does not turn on the communication function of the vehicle-exterior NFC module 16 until the lock/unlock SW 14 is operated, and when the lock/unlock SW 14 is operated, the NFC request unit 1042 turns on the communication function concerned continuously for a predetermined period. It is also preferable to employ a configuration in which the NFC request unit 1042 does not turn on the communication function of the vehicle-interior NFC module 16 until the starting SW 15 is operated, and when the starting SW 15 is operated, the NFC request unit 1042 turns on the communication function continuously for a predetermined period.

Third Embodiment

The first embodiment describes the configuration in which the LF request unit 1041 has turned on intermittently the communication function of the LF transmitter 12 to transmit the request signal from the LF transmission antenna 11 outside the vehicle before the lock/unlock SW 14 is operated. However, the configuration is not necessarily limited to the above. The first embodiment also describes the example in which the LF request unit 1041 has turned on intermittently the communication function of the LF transmitter 12 to transmit the request signal from the LF transmission antenna 11 inside the vehicle before the starting SW 15 is operated. However, the configuration is not necessarily limited to the example.

It is preferable to employ a configuration in which, when the lock/unlock SW 14 is operated, the LF request unit 1041 turns on the communication function of the LF transmitter 12 to transmit the request signal from the vehicle-exterior LF transmission antenna 11. It is preferable to employ a configuration in which, when the starting SW 15 is operated, the LF request unit 1041 turns on the communication function of the LF transmitter 12 to transmit the request signal from the vehicle-interior LF transmission antenna 11. These configurations are referred to as a third embodiment hereinafter. The communication function of the LF transmitter 12 according to the third embodiment may be turned on intermittently, or may not be turned on intermittently.

Even in the case where the third embodiment is employed, the LF request unit 1041 and the NFC request unit 1042 perform exclusive control so that the communication function to perform the LF communication in the LF transmitter 12 and the communication function to perform the NFC communication in the NFC module 16 may be turned on exclusively. The exclusive control described here is desirable in order to avoid mutual communication interference. Here, an example of the exclusive control in the third embodiment which turns on exclusively one of the communication function to perform the LF communication and the communication function to perform the NFC communication is explained with reference to FIG. 9. FIG. 9 illustrates an example in the case of turning on exclusively one of the communication function of the LF communication in the LF transmitter 12 to transmit a request signal from the vehicle-exterior LF transmission antenna 11, and the communication function of the NFC communication in the vehicle-exterior NFC module 16. FIG. 9 illustrates the changes accompanying the time progress of: turning on/off of the communication function to perform the LF communication; detecting/non-detecting of the operation of the lock/unlock SW 14; and turning on/off of the communication function to perform the NFC communication.

First, as illustrated in FIG. 9, the communication function to perform the LF communication and the communication function to perform the NFC communication are not turned on until the lock/unlock SW 14 is operated. Subsequently, as illustrated in FIG. 9, when the lock/unlock SW 14 is operated, the communication function to perform the LF communication is turned on earlier, and after the communication function to perform the LF communication is turned on, the communication function to perform the NFC communication is turned on. The communication function to perform the LF communication and the communication function to perform the NFC communication may be turned on intermittently, or may not be turned on intermittently.

It is also preferred for the LF request unit 1041 and the NFC request unit 1042 to perform exclusive control so that the communication function of the LF communication in the LF transmitter 12 to transmit a request signal from the vehicle-interior LF transmission antenna 11, and the communication function of the NFC communication in the vehicle-interior NFC module 16 may be exclusively turned on, as is the case with the example illustrated in FIG. 9. In more detail, the same scheme may be applied by replacing the detecting/non-detecting of the operation of the lock/unlock SW 14 illustrated in FIG. 9 to the detecting/non-detecting of the operation of the starting SW 15.

Fourth Embodiment

The above-described embodiment explains the configuration in which, depending on detecting/non-detecting of operation of the lock/unlock SW 14 or the starting SW 15, the LF request unit 1041 and the NFC request unit 1042 change the turning on/off of the communication function to perform the LF communication, and the turning on/off of the communication function to perform the NFC communication. However, the configuration is not necessarily limited to the above. For example, it is preferable to employ a configuration in which the communication function to perform the LF communication and the communication function to perform the NFC communication are turned on intermittently, irrespective of detecting/non-detecting of operation of the lock/unlock SW 14 and the starting SW 15. Even in the case where the present configuration is employed, the LF request unit 1041 and the NFC request unit 1042 perform exclusive control so that the communication function to perform the LF communication in the LF transmitter 12 and the communication function to perform the NFC communication in the NFC module 16 may be turned on exclusively. The exclusive control described here is desirable in order to avoid mutual communication interference.

Fifth Embodiment

The above-described embodiment explains the configuration in which, when the response acquisition unit 105 acquires the response signal, the verification unit 107 performs verification employing the code included in the response signal acquired by the response acquisition unit 105. However, the configuration is not necessarily limited to the above. For example, it is preferable to employ a configuration in which it is possible to set in advance whether the verification unit 107 performs the verification or not, and in which, when it has been set not to perform the verification, the verification unit 107 does not perform the verification. According to the present configuration, it is possible to change dynamically whether to use the portable device 2 for the authentication of the service vehicle.

Sixth Embodiment

The above-described embodiment explains the configuration in which the vehicle-side unit 1 is provided with the LF transmission antenna 11, the LF transmitter 12, and the RF receiver 13. However, the configuration is not necessarily limited to the above. For example, it is preferable to employ a configuration in which the vehicle-side unit 1 is not provided with the LF transmission antenna 11, the LF transmitter 12, and the RF receiver 13, and in which the verification ECU 10 is not provided with the LF request unit 1041. The present case corresponds to the configuration in which the portable device 2 is not used for the authentication of the service vehicle.

Seventh Embodiment

The above-described embodiment explains the configuration in which the verification ECU 10 is provided with the display instruction unit 109. However, the configuration is not necessarily limited to the above. For example, it is preferable to employ a configuration in which the verification ECU 10 is not provided with the display instruction unit 109 and no identification display is carried out.

Note that the present disclosure is not limited to the embodiments described above and can variously be modified within the scope of claims. An embodiment obtained by appropriately combining the technical means disclosed in the different embodiments is also included in the technical scope of the present disclosure.

Each unit can be divided into a plurality of sub-units, while it is also possible for a plurality of units to be combined into one unit. Further, each unit configured in this way can be referred to as a circuit, a device, a module, or a means.

Also, each or a combination of the plurality of portions may be implemented as (i) a portion of software in combination with a hardware unit (for example, a computer), as well as (ii) a portion of hardware (for example, an integrated circuit, a wired logic circuit), with or without the functionality of the associated device. Further, the hardware part can be configured inside the microcomputer.

What is claimed is:
1. A vehicle authentication system comprising:
   a ring-type wearable device that has a ring shape to be worn on a finger of a user, has unique identification information, and includes a ring-side short-range communication unit configured to perform short-range wireless communication;

an in-vehicle device that is attached to a vehicle, and includes an authentication unit, a vehicle-side short-range communication unit, and a reception information acquisition unit, the authentication unit configured to perform authentication regarding use of the vehicle, the vehicle-side short-range communication unit configured to cause a short-range communication module attached to the vehicle to perform the short-range wireless communication, and the reception information acquisition unit configured to acquire information received by a wide area communication module attached to the vehicle and configured to communicate via a network; and a communication terminal that includes a reservation unit, a terminal-side short-range communication unit, and a terminal-side wide area communication unit, the reservation unit configured to make a reservation for the use of the vehicle, the terminal-side short-range communication unit configured to perform the short-range wireless communication, and the terminal-side wide area communication unit configured to communicate via the network, wherein when the ring-side short-range communication unit performs the short-range wireless communication with the terminal-side short-range communication unit, the ring-side short-range communication unit transmits the identification information to the terminal-side short-range communication unit by the short-range wireless communication, when the reservation unit makes the reservation, the terminal-side wide area communication unit transmits the identification information to the wide area communication module via the network, the short-range communication module is located at a position at which a part of the vehicle operated by a finger of the user is included in a communication range of the short-range wireless communication of the short-range communication module, when the ring-side short-range communication unit performs the short-range wireless communication with the short-range communication module, the ring-side short-range communication unit transmits the identification information to the short-range communication module by the short-range wireless communication, and the authentication unit performs the authentication based on verification between the identification information received by the short-range communication module and the identification information acquired by the reception information acquisition unit.

2. The vehicle authentication system according to claim 1, wherein
the vehicle-side short-range communication unit intermittently turns on a communication function of the short-range communication module for performing the short-range wireless communication.

3. The vehicle authentication system according to claim 1, wherein
the short-range communication module is located at the position at which a switch of the vehicle operated by the finger of the user is included in the communication range of the short-range wireless communication of the short-range communication module, and when the switch is operated, the vehicle-side short-range communication unit continuously turns on a communication function of the short-range communication module for performing the short-range wireless communication for a predetermined period.

4. The vehicle authentication system according to claim 1, wherein
the short-range communication module is located at the position at which a switch of the vehicle operated by the finger of the user is included in the communication range of the short-range wireless communication of the short-range communication module, the vehicle-side short-range communication unit intermittently turns on a communication function of the short-range communication module for performing the short-range wireless communication, and when the switch is operated, the vehicle-side short-range communication unit continuously turns on the communication function for a predetermined period longer than a period for which the communication function is intermittently turned on.

5. The vehicle authentication system according to claim 1, wherein
the in-vehicle device further includes a display instruction unit configured to cause a display device of the vehicle to perform display indicative of the use by an authorized user when the verification between the identification information received by the short-range communication module and the identification information acquired by the reception information acquisition unit is established.

6. The vehicle authentication system according to claim 1, wherein
the in-vehicle device further includes a request transmission unit configured to transmit a request signal for requesting a portable device carried by the user and different from the ring-type wearable device to transmit a code for the verification via long wave communication which is wireless communication using a long wave and different from the short-range wireless communication, and the vehicle-side short-range communication unit and the request transmission unit exclusively turn on a communication function of the short-range communication module for performing the short-range wireless communication and a communication function for performing the long wave communication respectively.

7. The vehicle authentication system according to claim 6, wherein
the short-range communication module is located at the position at which a switch of the vehicle operated by the finger of the user is included in the communication range of the short-range wireless communication of the short-range communication module, when the switch is operated, the vehicle-side short-range communication unit continuously turns on the communication function for performing the short-range wireless communication for a predetermined period, before the switch is operated, the request transmission unit intermittently turns on the communication function for performing the long wave communication, and when the switch is operated, the request transmission unit turns off the communication function for performing the long wave communication at least for the period for which the vehicle-side short-range communication unit turns on the communication function for performing the short-range wireless communication.

8. The vehicle authentication system according to claim 6, wherein the in-vehicle device further includes a response acquisition unit configured to acquire the code for the verification, and the authentication unit performs the authentication based on the verification by the code.

9. An in-vehicle device attached to a vehicle comprising:

an authentication unit configured to perform authentication regarding use of the vehicle;

a vehicle-side short-range communication unit configured to cause a short-range communication module to perform short-range wireless communication with a ring-type wearable device that has a ring shape to be worn on a finger of a user, and has unique identification information; and a reception information acquisition unit configured to acquire information received by a wide area communication module configured to communicate, via a network, with a communication terminal configured to make a reservation for the use of the vehicle, wherein the short-range communication module is located at a position at which a part of the vehicle operated by the finger of the user is included in a communication range of the short-range wireless communication of the short-range communication module, when the communication terminal makes the reservation, the reception information acquisition unit acquires, via the network, the identification information received by the wide area communication module from the ring-type wearable device through the communication terminal, and when the short-range communication module performs the short-range wireless communication with the ring-type wearable device, the authentication unit performs the authentication based on verification between identification information received by the short-range communication module from the ring-type wearable device and the identification information acquired by the reception information acquisition unit.

10. An in-vehicle device attached to a vehicle comprising a processor configured to:

perform authentication regarding a use of the vehicle;

cause a short-range communication module to perform short-range wireless communication with a ring-type wearable device that has a ring shape to be worn on a finger of a user, and has unique identification information; and acquire information received by a wide area communication module configured to communicate, via a network, with a communication terminal configured to make a reservation for the use of the vehicle, wherein the short-range communication module is located at a position at which a part of the vehicle operated by the finger of the user is included in a communication range of the short-range wireless communication of the short-range communication module, when the communication terminal makes the reservation, the processor acquires, via the network, the identification information received by the wide area communication module from the ring-type wearable device through the communication terminal, and when the short-range communication module performs the short-range wireless communication with the ring-type wearable device, the processor performs the authentication based on verification between identification information received by the short-range communication module from the ring-type wearable device and the identification information acquired by the processor.

\* \* \* \* \*